United States Patent
Fourez et al.

(10) Patent No.: US 10,304,041 B2
(45) Date of Patent: *May 28, 2019

(54) METHOD FOR PROVIDING A CREDIT CARDHOLDER WITH MULTIPLE FUNDING OPTIONS

(71) Applicant: MASTERCARD INTERNATIONAL INCORPORATED, Purchase, NY (US)

(72) Inventors: Pablo Fourez, White Plains, NY (US); Mikael Tichelaer, Leuven (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,610

(22) Filed: Dec. 28, 2017

(65) Prior Publication Data

US 2018/0137481 A1    May 17, 2018

Related U.S. Application Data

(63) Continuation of application No. 12/537,853, filed on Aug. 7, 2009, now Pat. No. 9,858,554.

(Continued)

(51) Int. Cl.
*G06Q 20/08* (2012.01)
*G06Q 20/02* (2012.01)
(Continued)

(52) U.S. Cl.
CPC ............. *G06Q 20/08* (2013.01); *G06Q 20/02* (2013.01); *G06Q 20/04* (2013.01); *G06Q 20/105* (2013.01);
(Continued)

(58) Field of Classification Search
CPC ......... G06Q 20/00–20/06; G06Q 40/00–40/08
See application file for complete search history.

(56) References Cited

U.S. PATENT DOCUMENTS 6,315,193 B1    11/2001  Hogan
6,793,131 B2     9/2004  Hogan
(Continued)

OTHER PUBLICATIONS

U.S. Nonprovisional Patent Application; Inventors: Daniel J. Eckert et al.; Title: Systems and Methods for Adding Functionality to a UIS for Use at a Point of Interaction; U.S. Appl. No. 12/395,604, filed Feb. 27, 2009.

(Continued)

*Primary Examiner* — Narayanswamy Subramanian
(74) *Attorney, Agent, or Firm* — Budzyn IP Law, LLC (57) ABSTRACT

A method and a system for providing a payment cardholder with multiple funding source options for a payment card are provided herein. First, a managing platform associates at least two funding sources with the payment card. The funding sources include a first funding source and a second funding source. Next, the first funding source is designated as a default funding source and a set of pre-defined routing rules for funding transactions made with the payment card. Then, the managing platform intercepts each transaction of the payment card and routes the transactions to an issuer funding system for the first funding source using the managing platform.

2 Claims, 5 Drawing Sheets

Related U.S. Application Data (60) Provisional application No. 61/086,913, filed on Aug. 7, 2008.

(51) Int. Cl.
*G06Q 20/04* (2012.01)
*G06Q 20/10* (2012.01)
*G06Q 20/22* (2012.01)
*G06Q 20/34* (2012.01)
*G06Q 20/40* (2012.01)
*G06Q 40/02* (2012.01)

(52) U.S. Cl.
CPC ......... *G06Q 20/227* (2013.01); *G06Q 20/357* (2013.01); *G06Q 20/40* (2013.01); *G06Q 40/02* (2013.01)

(56) References Cited

U.S. PATENT DOCUMENTS

| | | | |
|---|---|---|---|
| 7,401,731 B1 | 7/2008 | Pletz et al. | |
| 7,702,559 B2 | 4/2010 | Shah et al. | |
| 7,765,154 B2 | 7/2010 | Shah et al. | |
| 2003/0061157 A1* | 3/2003 | Hirka | G06Q 20/04 705/39 |
| 2004/0117300 A1 | 6/2004 | Jones et al. | |
| 2004/0133487 A1 | 7/2004 | Hanagan et al. | |
| 2005/0049964 A1 | 3/2005 | Winterer et al. | |
| 2005/0209962 A1 | 9/2005 | Hogan | |
| 2006/0064378 A1 | 3/2006 | Clementz et al. | |
| 2006/0229977 A1 | 10/2006 | Schleicher | |
| 2006/0235758 A1* | 10/2006 | Schleicher | G06Q 20/02 705/26.1 |
| 2006/0259390 A1* | 11/2006 | Rosenberger | G06Q 20/04 705/35 |
| 2007/0119919 A1* | 5/2007 | Hogg | G06Q 20/04 235/380 |
| 2007/0119921 A1* | 5/2007 | Hogg | G06Q 20/04 235/380 |
| 2007/0228156 A1 | 10/2007 | Eckert | |
| 2007/0228157 A1 | 10/2007 | Eckert | |
| 2007/0250442 A1 | 10/2007 | Hogan et al. | |
| 2007/0265961 A1 | 11/2007 | Shah et al. | |
| 2008/0021829 A1 | 1/2008 | Kranzley | |
| 2008/0183619 A1 | 7/2008 | Gould et al. | |
| 2008/0244091 A1* | 10/2008 | Moore | G06Q 10/10 709/246 |
| 2008/0277465 A1 | 11/2008 | Pletz et al. | |
| 2009/0006251 A1 | 1/2009 | Haase et al. | |
| 2009/0037333 A1 | 2/2009 | Flitcroft et al. | |
| 2009/0099947 A1* | 4/2009 | Boehm | G06Q 20/10 705/35 |
| 2009/0171835 A1 | 7/2009 | Blythe | |
| 2010/0094735 A1 | 4/2010 | Reynolds et al. | |
| 2010/0288834 A1 | 11/2010 | Tichelaer et al. | |

OTHER PUBLICATIONS

U.S. Nonprovisional Patent Application; Inventors: Daniel J. Eckert et al.; Title: System and Methods for User Identification String Generation for Selection of a Function; U.S. Appl. No. 12/395,614, filed Feb. 27, 2009.

U.S. Provisional Patent Application; Inventors: Daniel J. Eckert et al.; Title: Systems and Methods for UIS Generation and Adding MUIS Functionality at a POI; U.S. Appl. No. 60/147,011, filed Jan. 23, 2009.

U.S. Provisional Patent Application; Inventor: Stuart Bain; Title: Systems and Methods for Automatic UIS Generation Under Activation Applet Failure; U.S. Appl. No. 61/151,480, filed Feb. 10, 2009.

\* cited by examiner

METHOD FOR PROVIDING A CREDIT CARDHOLDER WITH MULTIPLE FUNDING OPTIONS

CROSS-REFERENCES TO RELATED APPLICATIONS

This application is a continuation of U.S. patent application Ser. No. 12/537,853, filed Aug. 7, 2009, now U.S. Pat. No. 9,858,554, which claims priority to U.S. Provisional Patent Application No. 61/086,913 filed on Aug. 7, 2008, the contents of which are incorporated herein by reference in their entireties.

BACKGROUND OF THE INVENTION

Field of the Invention

The present invention generally relates to a payment card that provides multiple flexible payment or funding sources.

Brief Description of the Related Art

Today, consumers do not have flexible ways to control and change the funding source(s) associated with their payment card. As a result, they use different cards (debit, credit, store cards, etc.) for different types of purchases, purchase occasions and circumstances. Although, consumers do have some options with respect to interaction and choices regarding transaction channels, such as a Point of Sale (POS) terminal, Short Message Service (SMS), email, web interface and the systems pre-transaction, at the time of the transaction, and post transaction, there is no system that integrates all of these offerings into one convenient card.

In addition, there are some multi-account cards in the market today. These cards include more than one card account on the card itself, but each account must be either embossed on the card, encoded on the Magstripe and/or encoded on the CHIP at time of issuance. These cards require POS terminals, acceptance infrastructures and processes (including specific terminal to card communication protocols) that support such 'multi-account' cards. Multi-account card systems also do not provide consumers with ways to change or add additional funding sources.

Finally, although individual issuer processors may provide the consumer with services that enable the consumer to choose between multiple funding sources, none of the issuer processors support multiple funding sources at the network level across separate banks or financial institutions. The current methods also fail to provide intelligent authorization routing in real-time against multiple funding sources and potentially separate systems or financial institutions based on cardholder choice.

Therefore, it would be advantageous to provide a single payment card that provides the user with flexible payment options and the ability to choose multiple funding sources or between multiple funding sources without physically carrying multiple cards.

SUMMARY OF THE INVENTION

A method and a system for providing a payment cardholder with multiple funding source options for a payment card are provided herein.

A method of the present invention has a managing platform that associates at least two funding sources with the payment card. The funding sources include a preferred funding source and at least one alternate funding source. Next, the preferred funding source is designated as a default funding source and a set of pre-defined routing rules for funding transactions made with the payment card. Then, the managing platform intercepts each transaction of the payment card and routes the transactions to an issuer funding system for the preferred funding source based on the criteria defined in the routing rules using the managing platform.

A system of the present invention is adapted to provide a payment cardholder with multiple funding source options for a payment card. First, a managing platform is configured to associate at least two funding sources with the payment card, with the funding sources including a preferred funding source and at least one alternate funding source. Next, the preferred funding source is designated as a default funding source and a set of pre-defined routing rules are designated for funding transactions made with the payment card. Then, the managing platform is used to intercept each transaction of the payment card and the transactions are routed to a funding source based on the criteria defined in the routing rules for the preferred funding source using the managing platform.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

The present invention provides consumers with multiple, flexible payment or funding sources for purchases using one convenient payment card. The funding for individual purchases may be paid from one or more of the pre-defined funding sources, without restriction, based on rules, established preferences, or eligibility requirements. Additionally, the options for funding sources may or may not always be offered by the same financial institution, bank, or financial management system that issued the card. As used herein, the term financial institution also refers to banks and financial management systems. To enable flexibility in payment options, the present invention is configured to obtain payment authorization from the appropriate system or institution in real-time at the time of the transaction.

The present invention further provides consumers with the flexibility to select the funding source for a transaction based on pre-defined rules. The pre-defined rules may be changed by the consumer at any time. Once, the pre-defined rules are changed, the pre-defined rules will be applied to each subsequent transaction until the consumer changes the pre-defined rules. The pre-defined rules may be changed via a dedicated consumer interface, which includes but is not limited to a web interface, a voice interface, or a mobile interface.

The consumer may pre-define static or dynamic rules, depending on the transaction. A set of pre-defined rules may be applied in real-time when the transaction occurs based on one or more combinations of information such as, transaction amount, transaction location, merchant category, merchant name, transaction time and date, previous transaction history (e.g., cumulative spending), risk parameters determined by the bank or financial institution, cardholder preferences, and any ad-hoc other transaction eligibility conditions maintained by the managing platform. As such, this includes any transaction one skilled in the art would appreciate.

The present invention first requires a cardholder to use a managing platform, such as provided by "MasterCard inControl" owned and operated by MasterCard International Inc., to associate a payment card and at least two funding sources. MasterCard inControl is a managing platform that offers an array of advanced authorization, transaction routing, and alert controls designed to enable issuers to more quickly and cost-efficiently introduce new and enhanced products. More specifically, the managing platform is powerful and flexible, enabling issuers to efficiently customize their products based on specific consumer or corporate cardholder needs.

The funding sources contemplated in the present invention include, but are not limited to, the following: (1) payment from the consumer's current bank account either immediately using a debit card or on a deferred basis using a delayed debit card; (2) payment from a revolving line of credit; (3) payment in monthly installments, with or without interest; (4) payment from a home equity line of credit; (5) payment from an eligible healthcare account; and (6) payment through redemption of points on eligible loyalty or reward programs. The funding sources are preferably from a single financial institution, but may also include multiple financial institutions under, for example, a joint venture or a network of financial institutions. The examples provided herein show two funding sources, but the invention contemplates the use of any number of funding sources, as one skilled in the art would appreciate.

Then, the cardholder designates a set of pre-defined rules for selecting a preferred funding source, which may also be a first funding source or primary account, and at least one alternate funding source, which may also be a second funding source or a secondary account. The default funding source is a funding source selected from the set of at least two funding sources and will also be designated as either the preferred funding source or one of the alternate funding sources, depending on the set of pre-defined rules configured by the cardholder. After that, the managing platform intercepts each transaction of the payment card. The terms intercept and intercepting refer to the managing platform stopping the transaction and enhancing the transaction the moment the transaction enters the network to be routed to an issuer funding system. Note, that any response from the issuer funding system put on the network is also intercepted and enhanced the moment the transaction enters the network. Finally, the managing platform is used to selectively route the transaction to the preferred funding source and/or the at least one of the alternate funding sources based on the set of pre-defined rules.

With reference to FIGS. 1-5, the present invention is shown using a managing platform 10 to associate a payment card 12 with funding sources using the set of pre-defined rules configured by a cardholder 14.

Figure 1:
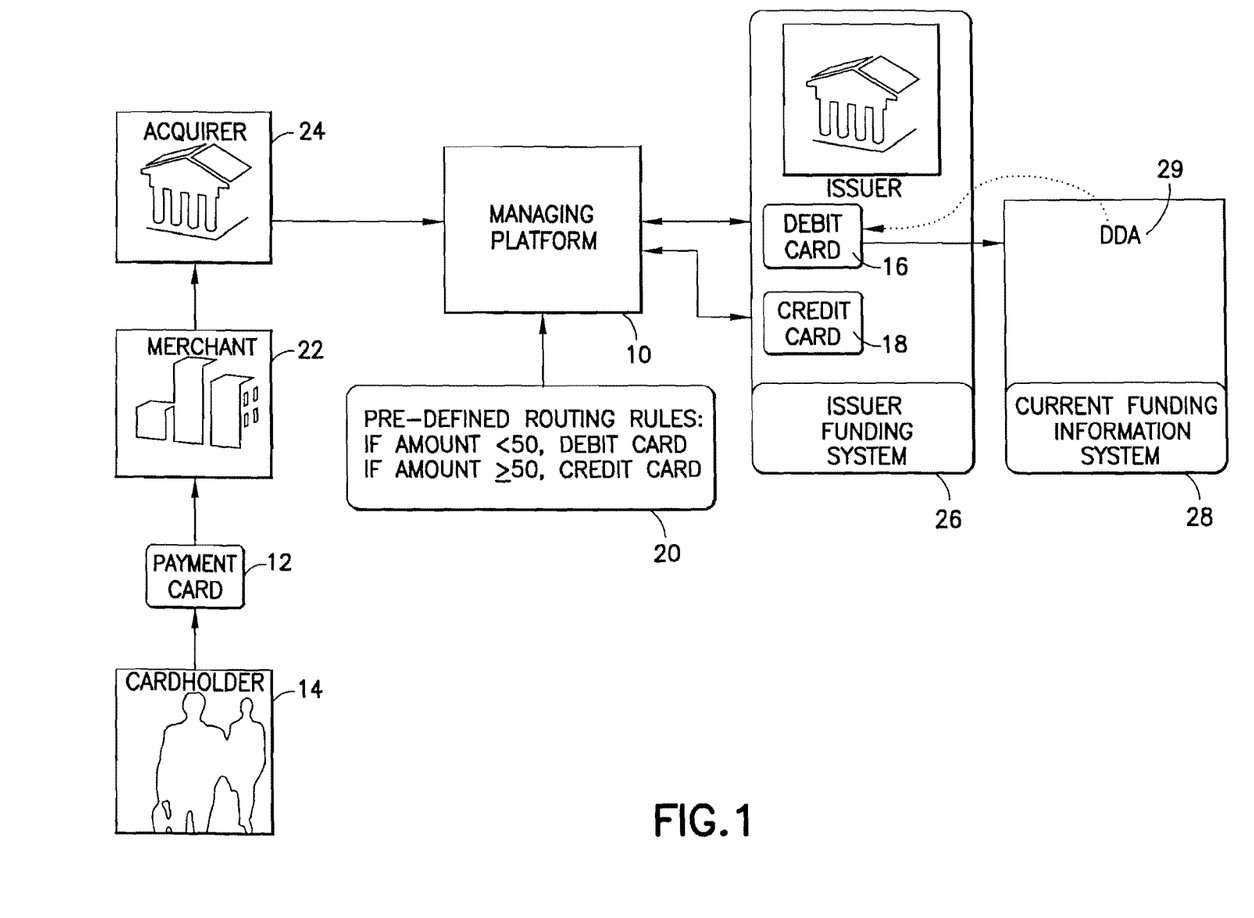
FIG. 1 is a pictorial diagram of a first embodiment of the present invention.

FIG. 1 shows a first embodiment of the present invention with the managing platform 10 having two funding sources from a single financial institution associated with a payment card 12 by a cardholder 14. The two funding sources may be a debit card 16, which includes a deferred debit card or a delayed debit card; and a credit card 18. The debit card 16 transaction will post to the funding source immediately or after a specified period depending on the type of debit card 16. The credit card 18 holds all transaction until the end of a statement period and at the end of the statement period, the cardholder 14 may pay the balance in full or use revolving credit. A set of pre-defined routing rules 20 designated for the funding sources of the first embodiment may be as follows: (1) if the transaction amount is less than fifty dollars, the transaction is routed to the debit card 16; and (2) if the transaction amount is greater than or equal to fifty dollars, the transaction is routed to the credit card 18.

After the cardholder 14 associates the payment card 12 with the funding sources and configures the set of pre-defined routing rules 20 with the managing platform 10, the cardholder 14 may use the payment card 12 for transactions. The cardholder 14 takes the payment card 12 to a merchant 22 to initiate the transaction. The merchant 22 sends the information to the acquirer 24 for an authorization and a clearing of the transaction, at which point the managing platform 10 intercepts the authorization and the clearing of the transaction. The managing platform 10 intercepts the transaction the moment the transaction enters the network to be routed to an issuer funding system 26. The managing platform 10 uses the set of pre-defined routing rules 20 to map the payment card 12 to the preferred funding source. The managing platform 10 then immediately routes transactions to the issuer funding system 26 of the preferred funding source.

In FIG. 1, if the transaction amount is less than fifty dollars, the managing platform 10 designates a debit card 16 as the preferred funding source and routes the transaction to the debit card 16. Use of the debit card 16 further requires a current funding information system 28 that provides authorization for the transaction. The verification parameters may include: verifying funds availability in the direct deposit account (DDA) linked to the debit card 16 or that a sufficient credit limit or an account balance is maintained on the debit card 16, and use of exception processing rules; setting a consolidated credit limit on a header account; and maintaining an account balance on a header account. Moreover, if the transaction amount in FIG. 1 is more than fifty dollars, the managing platform 10 routes the transaction to the credit card 18.

Figure 2:
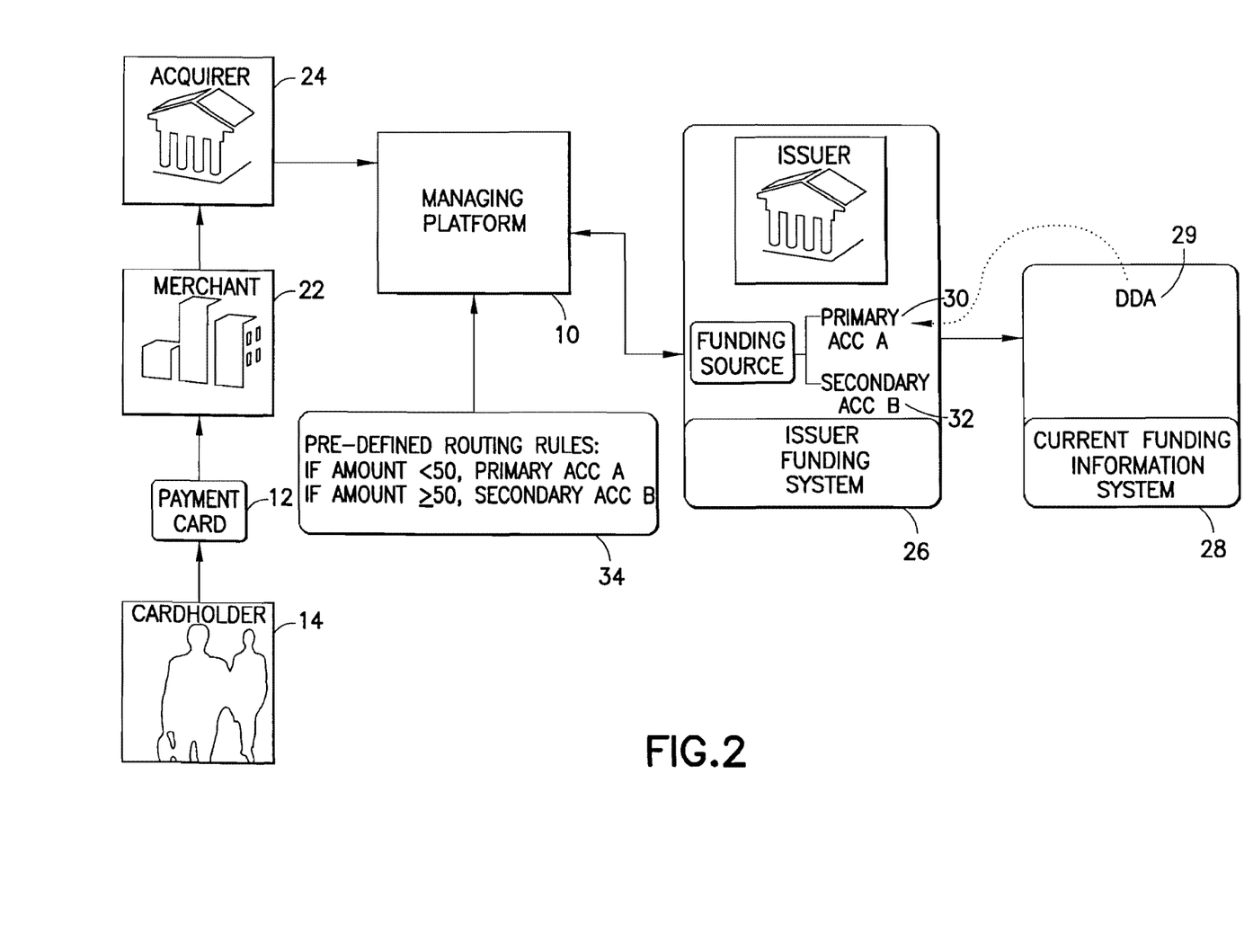
FIG. 2 is a pictorial diagram of a second embodiment of the present invention.

FIG. 2 shows a second embodiment of the present invention with the managing platform 10 having two funding sources from a single financial institution associated with a payment card 12 by a cardholder 14. The two funding sources may be a primary account A 30, which posts a transaction to a funding source, immediately or after a specified period, such as 3 days; and a secondary account B 32, which holds all transactions until the end of the statement period and at the end of the statement period, the cardholder 14 may pay the balance in full or use revolving credit. The set of pre-defined routing rules 20 designated for the funding sources may be as follows: (1) if the transaction amount is less than fifty dollars, the transaction is routed to the primary account A 30; and (2) if the transaction amount is greater than or equal to fifty dollars, the transaction is routed to the secondary account B 32.

After the cardholder 14 associates the payment card 12 with the funding sources and configures a set of pre-defined routing rules 34 with the managing platform 10, the cardholder 14 may use the payment card 12 for transactions. The cardholder 14 presents the payment card 12 to a merchant 22 to initiate the transaction. The merchant 22 sends the information to the acquirer 24 for an authorization and a clearing of the transaction, at which point the managing platform 10 intercepts the authorization and the clearing of the transaction. The managing platform 10 intercepts the transaction the moment the transaction enters the network to be routed to an issuer funding system 26. The managing platform 10 uses the set of pre-defined routing rules 34 to enhance the payment card 12 message with the preferred funding source reference and/or appropriate payment processing instructions. The managing platform 10 then immediately routes transactions to the issuer funding system 26.

In FIG. 2, if the transaction amount is less than fifty dollars, the managing platform 10 designates the primary account A 30 as the preferred funding source reference. Reference of the primary account A 30 further requires a current funding information system 28 that uses at least one verification parameter to provide authorization from a demand debit account 29 for the transaction. The verification parameters may include: verifying funds availability in the direct deposit account (DDA) linked to the account or that a sufficient credit limit or an account balance is maintained on the primary account A 30 and use of exception processing rules; setting a consolidated credit limit on a header account; and maintaining an account balance on a header account. Moreover, if the transaction amount in FIG. 2 is more than fifty dollars, the managing platform 10 will reference primary account B 32 to the issuer funding system 26.

The arrangement of FIGS. 1 and 2 allow selection of different funding sources depending on the amount of the transaction (i.e., above a certain amount, a particular funding source is selected, while below the certain amount, a different funding source is selected). As indicated above, the funding sources may be debit or credit cards (FIG. 1) and/or financial accounts (FIG. 2).

Figure 3:
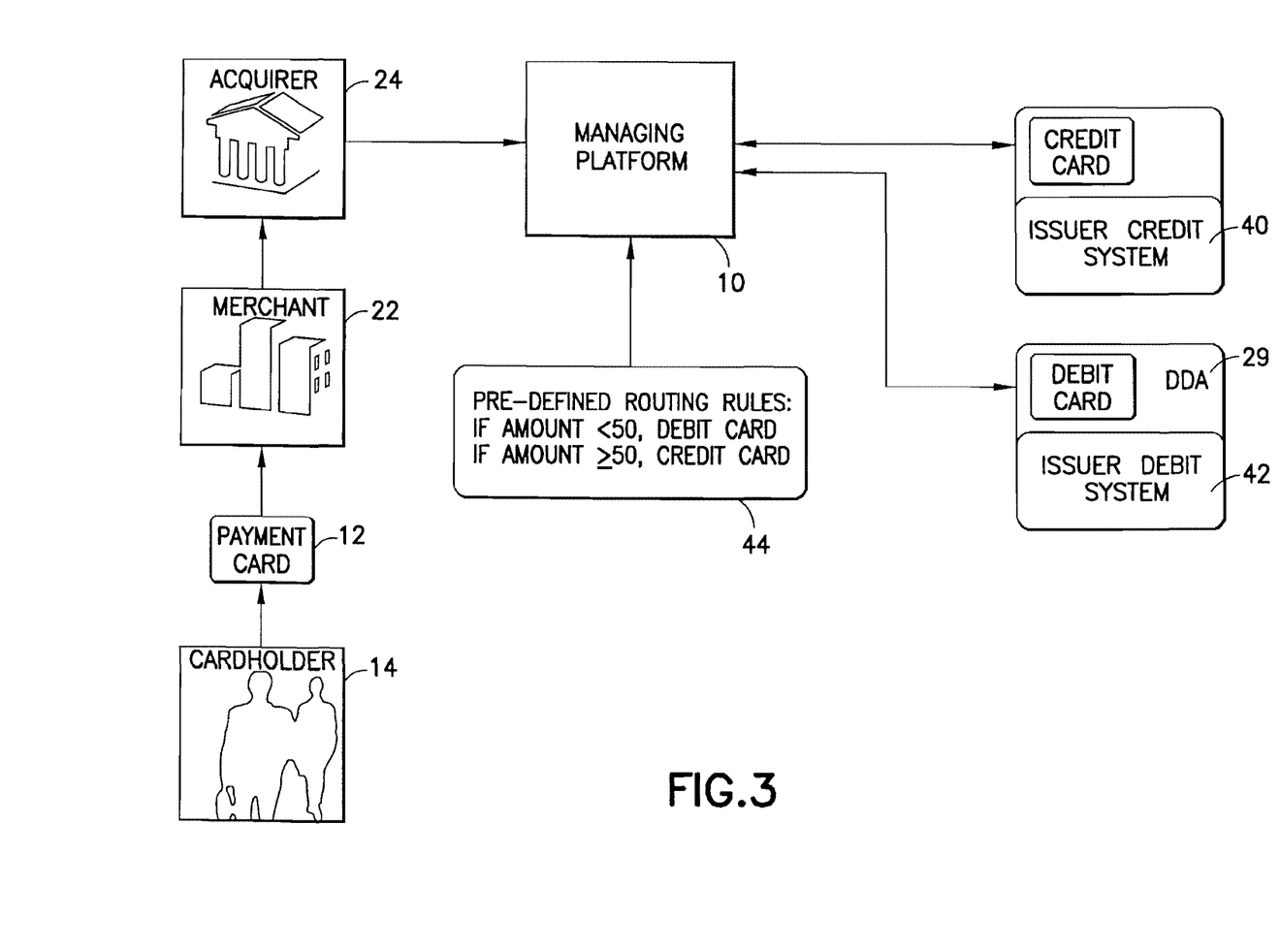
FIG. 3 is a pictorial diagram of a third embodiment of the present invention.

As will be appreciated by those skilled in the art, the funding sources may be provided by different financial institutions. FIG. 3 shows a third embodiment of the present invention with the managing platform 10 having two funding sources from two different financial institutions associated with a payment card 12 by a cardholder 14. The two funding sources may be a credit card 40 and a debit card 42. In the embodiment of FIG. 3, it is preferred that the credit card 40 and the debit card 42 may be made consistent in that they (1) share the same rules, and economics, such as chargeback; (2) offer the same cardholder 14 value and additional services, such as insurance and rewards. A set of pre-defined routing rules 44 may be configured for the funding sources as follows: (1) if the transaction amount is less than fifty dollars, the transaction is routed to the debit card 42; and (2) if the transaction amount is greater than or equal to fifty dollars, the transaction is routed to the credit card 40.

After the cardholder 14 associates the payment card 12 with the funding sources and configures the set of pre-defined routing rules 44 with the managing platform 10, the cardholder 14 may use the payment card 12 for transactions. The cardholder 14 presents the payment card 12 to a merchant 22 to initiate the transaction. The merchant 22 sends the information to the acquirer 24 for an authorization and a clearing of the transaction, at which point the managing platform 10 intercepts the authorization and the clearing of the transaction. The managing platform 10 intercepts the transaction the moment the transaction enters the network to be routed to an issuer funding system 26. The managing platform 10 uses the set of pre-defined routing rules 44 to map the payment card 12 to the preferred funding source. The managing platform 10 then immediately routes transactions to an issuer funding system of the credit card 40 or the debit card 42 of the preferred funding source.

In FIG. 3, if the transaction amount is less than fifty dollars, the managing platform 10 designates the debit card 42 as the preferred funding source and routes the transaction to the debit card 42. Use of the debit card 42 further requires authorization for the transaction from a direct deposit account 29 that uses at least one verification parameter. The verification parameters may include: verifying funds availability in the direct deposit account (DDA) linked to the card or that a sufficient credit limit or an account balance is maintained on the card 42 and use of exception processing rules; setting a consolidated credit limit on a header account; and maintaining an account balance on a header account. Moreover, if the transaction amount in FIG. 3 is more than fifty dollars, the managing platform 10 routes the transaction to the credit card 40.

In addition, payment of a transaction may be split over multiple funding sources (debit/credit cards and/or financial accounts). By way of non-limiting example, FIG. 4 shows the same arrangement as FIG. 1, but with funding of the transaction being possibly split between multiple funding sources.

Figure 4:
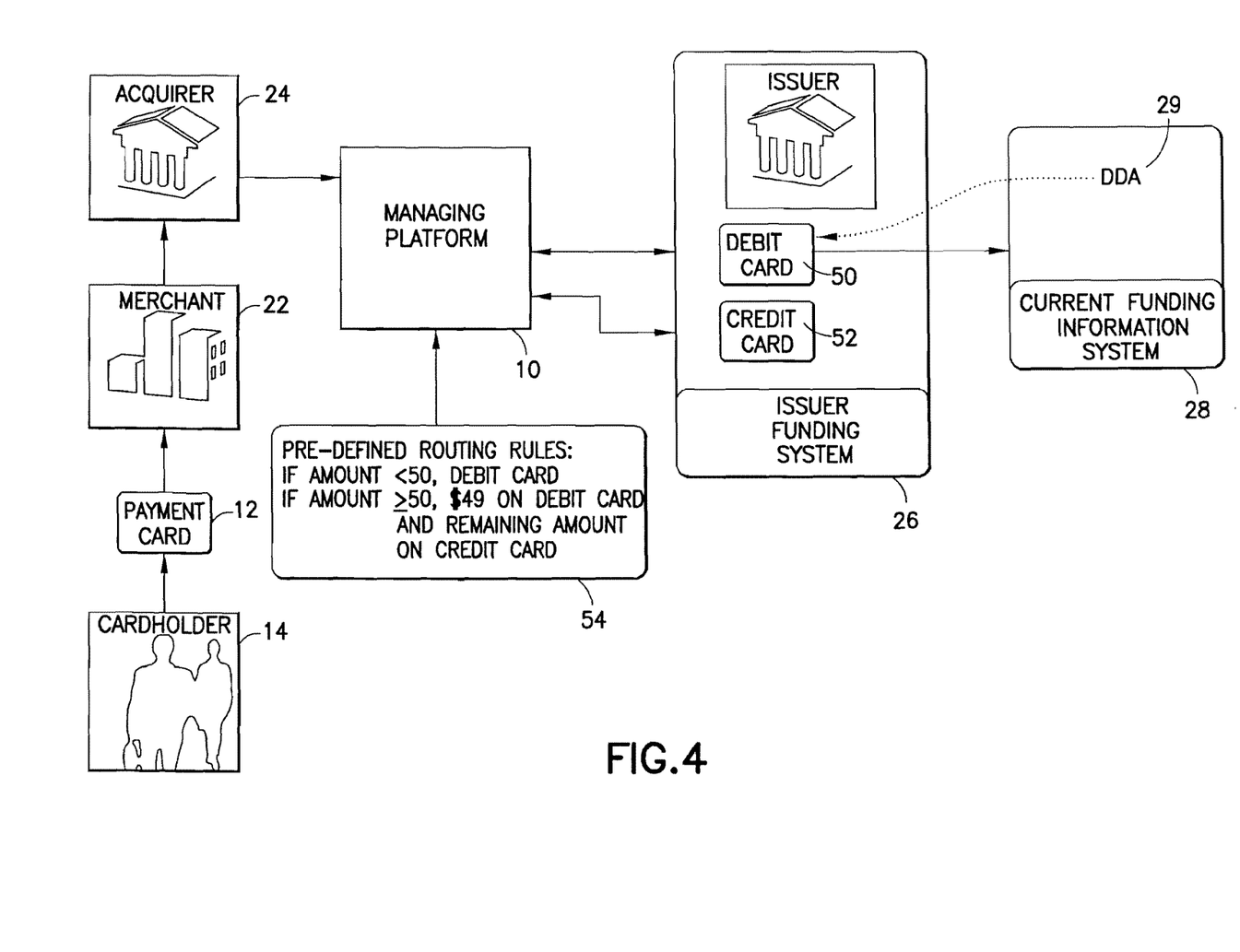
FIG. 4 is a pictorial diagram of a fourth embodiment of the present invention.

FIG. 4 shows a fourth embodiment of the present invention with the managing platform 10 having two funding sources from a single financial institution associated with a payment card 12 by a cardholder 14. The two funding sources may be a debit card 50, which includes a deferred debit card or a delayed debit card; and a credit card 52. The debit card 50 transaction will post to the funding source immediately or after a specified period depending on the type of debit card 50. The credit card 52 holds all transactions until the end of a statement period and at the end of the statement period, the cardholder 14 may pay the balance in full or use revolving credit. A set of pre-defined routing rules 54 designated for the funding sources of the fourth embodiment may be as follows: (1) if the transaction amount is less than fifty dollars, the transaction is routed to the debit card 50; and (2) if the transaction amount is greater than or equal to fifty dollars, the first forty-nine dollars of the transaction may be routed to the debit card 50, and the remaining balance may be routed to the credit card 52.

After the cardholder 14 associates the payment card 12 with the funding sources and configures the set of pre-defined routing rules 54 with the managing platform 10, the cardholder 14 may use the payment card 12 for transactions. The cardholder 14 takes the payment card 12 to a merchant 22 to initiate the transaction. The merchant 22 sends the information to the acquirer 24 for an authorization and a clearing of the transaction, at which point the managing platform 10 intercepts the authorization and the clearing of the transaction. The managing platform 10 intercepts the transaction the moment the transaction enters the network to be routed to an issuer funding system 26. The managing platform 10 uses the set of pre-defined routing rules 54 to map the payment card 12 to the preferred funding source. The managing platform 10 then immediately routes transactions to the issuer funding system 26 of the preferred funding source.

In FIG. 4, if the transaction amount is less than fifty dollars, the managing platform 10 designates a debit card 50 as the preferred funding source and routes the transaction to the debit card 50. Use of the debit card 50 further requires a current funding information system 28 that provides authorization for the transaction. The verification parameters may include: verifying funds availability in the direct deposit account (DDA) linked to the debit card 50 or that a sufficient credit limit or an account balance is maintained on the debit card 50, and use of exception processing rules; setting a consolidated credit limit on a header account; and maintaining an account balance on a header account. Moreover, if the transaction amount in FIG. 4 is more than fifty dollars, the managing platform 10 routes the first forty-nine dollars of the transaction to the debit card 50 and routes the remaining balance of the transaction to the credit card 52.

Figure 5:
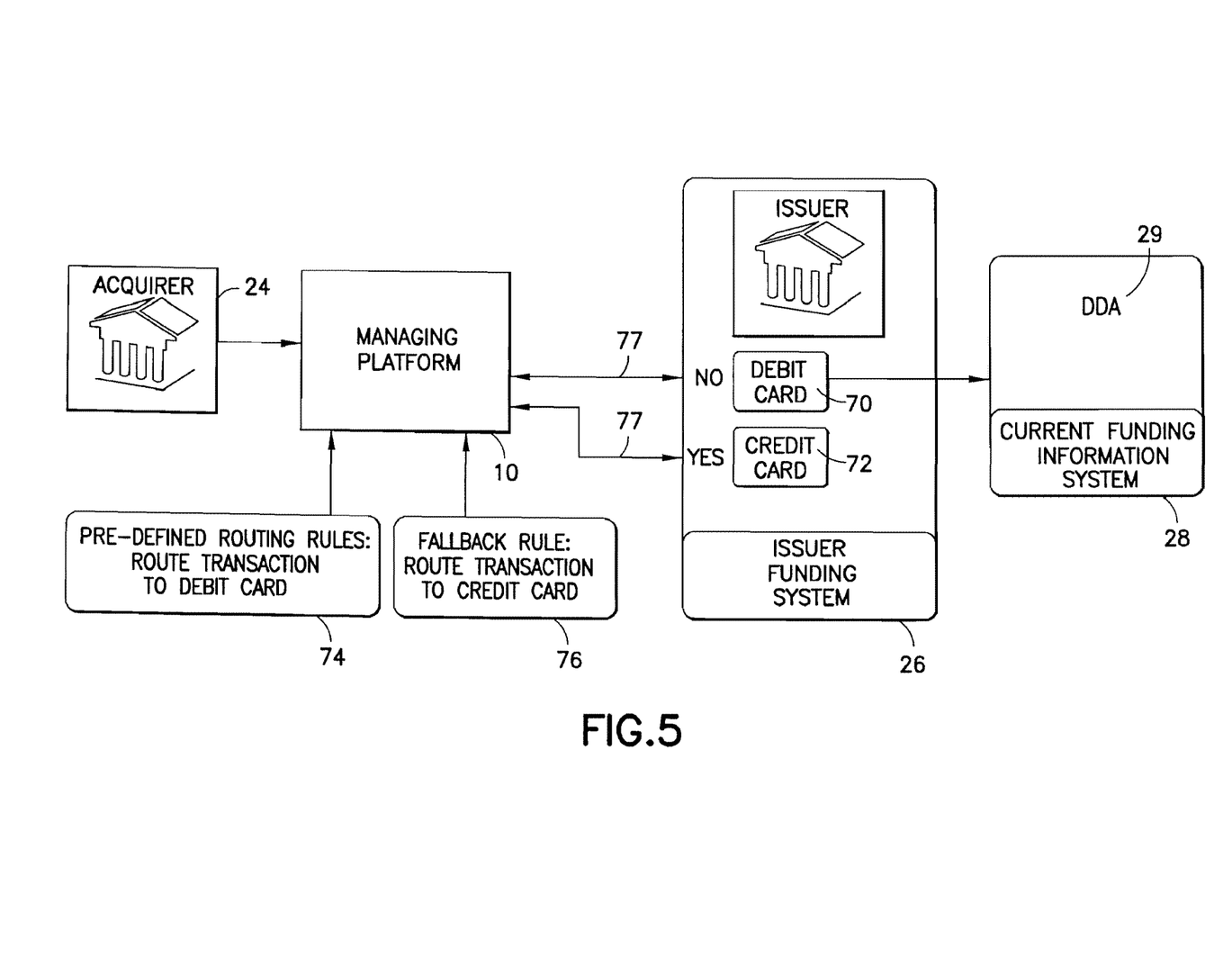
FIG. 5 is a pictorial diagram of a fifth embodiment of the present invention.

FIG. 5 shows a fifth embodiment of the present invention with a fallback funding option. As with the embodiments discussed above, the present invention allows rules to be set for selectively taking funds from multiple and/or different funding sources. If any funding source selected has insufficient funds, the managing platform 10 may be provided with rules for a fallback funding option. The fallback funding option may include a hierarchal list of at least one fallback funding source for use when any funding source has insufficient funds (i.e., at least one fallback funding source may be used where funds are insufficient in a preferred account). In this embodiment, a debit card 70 is the default account and a credit card 72 is the fallback funding option. The managing platform 10 has a set of pre-defined routing rules 74 and a set of fallback rules 76 to determine the funding source. The managing platform 10 forwards an authorization for the transaction according to the set of pre-defined routing rules 74. When a transaction is declined due to insufficient funds 77 on the debit card 70, the managing platform 10 uses the set of fallback rules 76, which routes transactions to the credit card based on the pre-determined duration period with the fallback rules 76.

As with the previous embodiments, a current funding information system 28 maintains an accounting of funds available for the debit card 70 and provides authorization for transactions from a direct deposit account 29 that uses at least one verification parameter. The verification parameters may include: verifying that a credit limit or an account balance is maintained on the debit card 70 and use of exception processing rules; setting a consolidated credit limit on a header account; and maintaining an account balance on a header account.

Advantages of the present invention include the ability to support multiple funding sources across multiple or different banks and financial institutions and support for funding a single transaction from multiple funding sources. Additionally, the managing platform 10 of the present invention supports cardholder 14 interactions across multiple channels, including but not limited to Point of Sale terminals, SMS, email, and web interfaces. A further advantage of the present invention is the ability to manage a diverse and complex set of rules and eligibility requirements for how transactions are funded. Yet another advantage of the present invention is the managing platform's intelligent authorization routing in real-time, against multiple funding sources and potentially separate systems or institutions, based on the cardholder's choice.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A system adapted to provide a consumer with multiple funding source options for a payment instrument, the system comprising:

a managing platform on a network configured to associate at least two funding sources with the payment instrument; and, a mobile interface configured to allow the consumer to determine a set of routing rules for transaction messages related to financial transactions conducted by the payment instrument, wherein, the managing platform being configured and operative to intercept each of the transaction messages of the payment instrument entering the network, the intercepted transaction messages being enhanced, by the managing platform, with a funding source and/or appropriate payment processing instructions, based on the set of routing rules, to selectively map the intercepted transaction messages regarding the at least two funding sources, the management platform being configured to route the enhanced transaction messages to one or more of the at least two funding sources based on the mapping, wherein, the set of routing rules being changeable by the consumer using the mobile interface such that, following a change in the set of routing rules, the managing platform enhances the intercepted transaction messages based on the changed set of routing rules.

2. A system adapted to provide a consumer with multiple funding source options for a payment instrument, the system comprising:

a managing platform on a network configured to associate at least two funding sources with the payment instrument; and, a web interface configured to allow the consumer to determine a set of routing rules for transaction messages related to financial transactions conducted by the payment instrument, wherein, the managing platform being configured and operative to intercept each of the transaction messages of the payment instrument entering the network, the intercepted transaction messages being enhanced, by the managing platform, with a funding source and/or appropriate payment processing instructions, based on the set of routing rules, to selectively map the intercepted transaction messages regarding the at least two funding sources, the management platform being configured to route the enhanced transaction messages to one or more of the at least two funding sources based on the mapping, wherein, the set of routing rules being changeable by the consumer using the web interface such that, following a change in the set of routing rules, the managing platform enhances the intercepted transaction messages based on the changed set of routing rules.

* * * * *